UNITED STATES PATENT OFFICE.

JOHN EDWARD PAUL MEYER, OF GOLDEN, COLORADO.

COMPOSITION FOR DEVELOPING OZONIZED OXYGEN.

SPECIFICATION forming part of Letters Patent No. 392,742, dated November 13, 1888.

Application filed April 21, 1888. Serial No. 271,455. (Specimens.)

*To all whom it may concern:*

Be it known that I, Prof. JOHN EDWARD PAUL MEYER, of Golden, in the county of Jefferson and State of Colorado, have invented a new and Improved Compound for the Development of Ozonized Oxygen in Sick-Rooms and Elsewhere, of which the following is a full, clear, and exact description.

The object of my invention is to furnish a ready, safe, and simple manner of preparing ozonized oxygen in sick-rooms and elsewhere. This has been done by the well-known process of mixing concentrated sulphuric acid with permanganate of potassium or bichromate of potassium, which is not only inconvenient, but dangerous, in the hands of inexperienced persons. It has also been proposed to manufacture ozone by the reaction between permanganate of potash and soda and an acid salt of sulphuric acid as a substitute for the sulphuric acid alone; but the reaction of an acid salt of sulphuric acid upon an alkaline permanganate is very feeble, oxygen being evolved very slowly, and the reaction as a whole was very incomplete, as a large amount of the material would remain undecomposed. The reason for this is very plain. The permanganic acid has a strong affinity for its alkaline base, and as the sulphuric acid of the acid salt could at best only act as a diluted free acid, the reaction was consequently feeble and incomplete.

My invention consists in a compound composed of barium permanganate and an acid salt of sulphuric acid. In this case the sulphuric acid of the bisulphate (although acting only as a dilute free acid) must by chemical necessity unite completely with the barium to form insoluble barium sulphate, thus necessarily setting free all the permanganic acid.

To prepare my compound, I take of permanganate of barium, $(Ba(MnO_4)_2,)$ the molecular weight of which is 375—25 parts by weight, and anhydrous bisulphate of sodium, $(NaHSO_4,)$ the molecular weight of which is 120—16 parts by weight, or thereabout, preferably not less than this amount. These salts I separately reduce to powder and then intimately mix the same together, with or without the addition of any desired amount of an inert substance—such, for instance, as the sulphate of barium—to give bulk and convenience in manipulating.

The barium permanganate, although not a common commercial article, is nevertheless a stable finely-crystallized salt, which does not deliquesce, and is admirably adapted for my use.

To use this compound or composition of matter, a table-spoonful, more or less, of the mass is put in a cup or glass and sufficient water added, so that upon mixing and stirring the mixture will have the consistency of a thick sirup. This will cause the constituent parts of the compound to chemically react upon each other, the acid of the acid sulphate combining with the barium of the salt of the permanganic acid, and so perfectly setting free the permanganic acid, which then spontaneously decomposes into hydrate dioxide of manganese and free oxygen gas, which, moreover, is in an ozonized condition. The odor produced will immediately show the evolution of ozone, and after a while innumerable bubbles will be seen forming on the surface of the mixture, which will continue to gradually emit ozone for twenty-four hours, more or less, and will only require occasional stirring. By using warm water or setting the receptacle containing the mixture in a warm place the development of the ozonized oxygen will be hastened.

As the permanganate of barium may not be readily obtainable at all places, the following method of manufacturing the same may be resorted to in preparing my compound: Dissolve hydrated baryta $(BaO_4)_2$ in fusing chlorate of potash, $(KClO_3)$. Then add finely-pulverized dioxide of manganese, $(MnO_2)$. Let the fused mass cool and leach it out by boiling it in water, whereupon manganate of barium $(BaMnO_4)$ will be left as an insoluble green powder. This manganate of barium distribute in water and pass a current of carbonic-acid gas $(CO_2)$ through, by which the manganate of barium will be changed into permanganate of barium, $(Ba(MnO_4)_2,)$ according to the formula—

$$3BaMnO_4 + 2CO_2 + H_2O = 2BaCo_3 + H_2MnO_3 + Ba(MnO_4)_2.$$

$BaCo_3$ and $H_2MnO_3$ being insoluble, the liquid contains the $Ba(MnO_4)_2$—*i. e.*, permanganate of barium—in solution, together with a small quantity of bicarbonate of barium. Decant the liquid and heat it, whereupon the bicarbonate of barium is broken up into escaping carbonic-acid gas and carbonate of barium, which settles down as insoluble. Decant now again, and the liquid will now contain only the permanganate of barium in solution, which can be produced in the dry state by evaporation.

Having thus described my invention, what I claim as new, and desire to secure by Letters Patent, is—

The herein-described compound or composition of matter to be used for the development of ozonized oxygen in sick-rooms and elsewhere, the constituent parts of which are barium permanganate and the acid salts of sulphuric acid in powdered form, in or about the proportions specified, the same to be used in connection with water, as set forth.

JOHN EDWARD PAUL MEYER.

Witnesses:
REGIS CHAUVENET,
GEO. C. TILDEN.